United States Patent
McCrory et al.

(10) Patent No.: US 8,281,516 B2
(45) Date of Patent: Oct. 9, 2012

(54) APPARATUS AND METHODOLOGIES FOR FERTILIZATION, MOISTURE RETENTION, WEED CONTROL, AND SEED, ROOT, AND PLANT PROPAGATION

(75) Inventors: Phillip A. McCrory, Madison, AL (US); Richard A. Holloway, Owens Cross Roads, AL (US); Blair K. Blacker, Homestead, FL (US); Maurice L. Hanson, Jr., Cumming, GA (US); Carlos M. Sarria, Homestead, FL (US)

(73) Assignee: Phillip A. McCrory, Madison, AL (US)

( * ) Notice: Subject to any disclaimer, the term of this patent is extended or adjusted under 35 U.S.C. 154(b) by 2083 days.

(21) Appl. No.: 11/033,024

(22) Filed: Jan. 11, 2005

(65) Prior Publication Data
US 2006/0150476 A1      Jul. 13, 2006

(51) Int. Cl.
*A01G 7/00* (2006.01)
(52) U.S. Cl. .................................. 47/5.5; 47/9
(58) Field of Classification Search .................. 47/9, 5.5; 405/302.6, 302.7
See application file for complete search history.

(56) References Cited

U.S. PATENT DOCUMENTS

| | | | |
|---|---|---|---|
| 3,958,365 A | 5/1976 | Proctor | |
| 4,219,600 A | 8/1980 | Surowitz et al. | |
| 5,344,470 A | 9/1994 | Molnar et al. | |
| 5,358,356 A | 10/1994 | Romanek et al. | |
| 5,393,313 A | 2/1995 | Reiger | |
| 5,421,123 A | 6/1995 | Sakate et al. | |
| 5,453,191 A | 9/1995 | McCrory et al. | |
| 5,464,455 A | 11/1995 | Molnar | |
| 5,853,541 A | 12/1998 | Monroe et al. | |
| 6,022,827 A * | 2/2000 | Kumar et al. | 435/320.1 |
| 6,029,395 A | 2/2000 | Morgan | |
| 6,146,529 A | 11/2000 | McCrory | |
| 6,219,965 B1 | 4/2001 | Ishikawa et al. | |

FOREIGN PATENT DOCUMENTS

| | | | |
|---|---|---|---|
| JP | 40-6153684 | | 6/1994 |
| JP | 7-177822 A | * | 7/1995 |
| JP | 177822 A | * | 7/1995 |
| JP | 2001086880 A | * | 4/2001 |

OTHER PUBLICATIONS

Stiffler. 1995. Aggressive Bamboo Hard to Contain. The Virginian-Pilot, 3 pages.*

(Continued)

*Primary Examiner* — Frank T Palo
(74) *Attorney, Agent, or Firm* — Frank M. Caprio; Bradley Arant Boult & Cummings LLP (57) ABSTRACT

An all-natural fiber biodegradable generally planar mat for use in the germination, growth enhancement and propagation of plants and trees and the suppression of weed growth is provided. The present invention comprises a generally planer layer of at least one or a combination of natural fibers including, but not limited to, human hair, animal hair, coconut fiber, seaweed, kelp, cotton, corn silk and peat moss, and alternatively may incorporate a plurality of man-made fibers. Such mat may be constructed using needle punching, hydro-entanglement, or aero-entanglement. The generally planar mat in a wide variety of constructions is used in various methodologies of promoting seed germination, root growth, spot growth on existing plantings, landscaping under-laminate, soil additive, and as a weed control and pest deterrent in the horticultural field. Within such context, the present invention is useful for the retention of moisture and both the active and passive fertilization of the plant(s) with which it is associated either under, within or on the surface of the soil.

40 Claims, 6 Drawing Sheets

OTHER PUBLICATIONS

Zheljazkov. 2005. Assessment of Wool Waste and Hair Waste as Soil Amendments and Nutrient Source. J. of Environ. Qual. 34: 2310-2317.*

English, Brent, "Biobased, Biodegradable Geotextiles: USDA Forrest Service Research Update." Second Pacific Rim Bio-Based Composites Symposium. Nov. 6-9, 1994, pp. 204-212.

* cited by examiner

APPARATUS AND METHODOLOGIES FOR FERTILIZATION, MOISTURE RETENTION, WEED CONTROL, AND SEED, ROOT, AND PLANT PROPAGATION

BACKGROUND OF THE INVENTION

This invention generally relates to an apparatus for aiding in and various methodologies for the propagation of plantings for both commercial and residential use. In particular, the present invention relates to an apparatus for aiding in the retention of moisture and the fertilization of plantings useful during various methods of plant propagation. More particularly, the present invention relates to a mat or other configurations of interwoven natural fibers suitable for use as both a moisture retention and fertilization source during the various stages of a plant's development. Still further, the present invention is directed to such an apparatus that may be used to provide for moisture retention, nutrient release, weed control, and nutrient leach reduction from the growth medium during a plant's growth cycle, as well as having the capacity to be mixed with the soil itself to both enrich the soil through nutrient release and recapture and ensure adequate aeration of a plant's roots. In such context, the present invention may serve simultaneously as both an active and passive fertilizer and a herbicide and may be comprised primarily of any individual component or combination of human hair, animal hair and/or natural biodegradable fiber, including, but not limited to, coconut fibers, seaweed, kelp, cotton, corn silk, and peat moss.

Those involved in growing plants for food, decoration or pleasure have long been aware that plants, trees, bushes and grasses require three main ingredients to maintain their health and to promote continued growth. These are sunlight, water and fertile soil. Gardeners, horticulturists and farmers have been actively manipulating these requirements for centuries. The present invention provides an apparatus for use in the manipulation of these elements. For instance, it can be used to block light to the soil surface immediately surrounding a plant and thus act as a weed barrier by denying undesired emerging growth the light needed to continue growing. Further, the present invention can aid in reducing the rapid evaporation of water from the soil by absorbing and retaining that moisture and releasing it slowly over time by acting as mulch. Finally, the present invention aids in reducing the leaching of vital nutrients from the soil by similarly retaining them through the creation of a humidity chamber, as well as, releasing nutrients into the soil during its own biodegradation. The present invention may also be impregnated with a fertilizer and/or pesticides to provide a total growth solution for most plantings.

No single apparatus is known that has been able to provide for the manipulation of all three of these ingredients. Farmers, for instance, have manipulated the delivery of water to their crops in an effort to ensure an adequate supply of water by establishing reservoirs, creating irrigation canals or, more recently, through the use of modern irrigation systems. They have also learned to enrich their soil by rotating crops and adding amendments thereto. Gardeners, hobbyists and homeowners have slowly begun adopting similar systems that allow for the delivery of a continuous flow of water to plants through the use of drip lines and soaking hoses. More often than in the past, they actively use fertilizers and other soil amendments in an effort to improve the growth of their plants.

These methods are often not functionally effective or practical for use with indoor or decorative plants or with individual larger outdoor plants. It is, therefore, desirable to provide an all-natural fully biodegradable device capable of being sized for a particular use and that is effective for the retention and maintenance of moisture while simultaneously acting as both an active or passive source of nutrients for the plant, as well as a natural weed control device. Still further, it is desirable to provide such an apparatus that is useful in the various methodologies of propagating plants as discussed herein. The present invention provides such an apparatus.

SUMMARY OF THE INVENTION

The present invention recognizes and addresses various of the foregoing limitations and drawbacks, and others, concerning various horticultural aids and methodologies and their use for indoor or decorative plants and trees or their use for individual plants and trees.

It is, therefore, a principle object of the present invention to provide an apparatus for an all-natural biodegradable device capable of aiding the horticulturalist in controlling all of the primary needs of all plants: sufficient moisture, sunlight, weed control, and adequately fertile soil. More particularly, it is an object of the present invention to provide such an apparatus that is capable of retaining moisture at or near the root system of a plant or near an intended point of growth on an existing plant through the creation of a humidity chamber and which is capable of blocking sunlight about the surrounding surface of the soil thus preventing weed growth, respectively. In such context, it is still a more particular object of the present invention to provide such an apparatus that serves to release nutrients to the plant with which it is associated during its biodegradation.

It is a further object of this invention to provide such an apparatus that may be comprised of human and/or animal hair and/or one or more other natural fibers, including, but not limited to, coconut, seaweed, kelp, cotton, corn silk and peat moss. In such context, it is a further object of the present invention to provide such an apparatus that requires no backing or scrim to retain the fibers as a single unit. Further, in such context, it is an object of the present invention to provide such an apparatus that is useful in the propagation of a plant whether it is a seedling, a cutting, or a re-planting. Still further, in such context, it is an object of the present invention to provide such an apparatus that may be sized for its intended use without altering the performance or capabilities of the apparatus. Finally, it is an object of the present invention to provide an apparatus that may be cut or formed into small pellets or cubes and mixed with soil to provide a fertile plant-potting medium.

Additional objects and advantages of the invention are set forth in, or will be apparent to those of ordinary skill in the art from, the detailed description as follows. Also, it should be further appreciated that modifications and variations to the specifically illustrated and discussed features and materials hereof may be practiced in various embodiments and uses of this invention without departing from the spirit and scope thereof, by virtue of present reference thereto. Such variations may include, but are not limited to, substitutions of the equivalent means, features, and materials for those shown or discussed, and the functional or positional reversal of various parts, features, or the like.

Still further, it is to be understood that different embodiments, as well as different presently preferred embodiments, of this invention, may include various combinations or configurations of presently disclosed features, elements, or their equivalents (including combinations of features or configurations thereof not expressly shown in the figures or stated in the detailed description).

These and other features, aspects and advantages of the present invention will become better understood with reference to the following descriptions and appended claims. The accompanying drawings, which are incorporated in and constitute a part of this specification, illustrate an embodiment of the invention and, together with the descriptions, serve to explain the principles of the invention.

In a first exemplary embodiment, there may be provided a generally homogeneous mat comprised of human hair. Such mat may best be described as a plurality of individual fibers of such material interwoven in a manner so as to retain them in a single cohesive construction without the use of a backing or intermediate layer.

One such construction of the apparatus of the first exemplary embodiment may involve the needle punching of individual strands of the above-referenced hair into the shape of a generally planar layer. This may be achieved through the introduction of one or a plurality of barbed needles into a mass of generally loose strands of the hair. The barbed end of the needle may pass through the mass of hair without significantly disturbing their relationship to one another. As the needle is brought out of the mass, however, the barbed end of the needle may serve to catch either an individual strand or a plurality of the hairs and intertwine them with others of the plurality of individual strands of hair within the mass. The repeated passage of the needle may serve to intertwine the hair such that a desired density and shape are achieved. While the planar layer may be cut, folded or otherwise machinated into any desired shape, the shape may also depend on the shape of the containment vessel holding the mass prior to the repeated introduction of the needle. No backing or intermediate material is required to maintain the intertwined mass of hair of such a construction and the intertwined nature of the individual strands of hair may provide a tensile strength that generally resists the tearing or falling apart of the generally planar layer.

A second exemplary construction of the first exemplary embodiment of the present invention may involve the use of hydro-entanglement of the hair. In such a construction, a mass of generally loose individual strands of hair may be subjected to one or a plurality of streams of water or other liquid that may serve to intertwine the individual strands. Unlike in the needle-punched construction of the present exemplary embodiment, the individual strands of hair of the hydro-entangled construction would be intertwined during the initial passage of the stream of liquid through the mass. Additionally, such construction technique may result in a more dense construction that would be useful as a lining in hanging plants or as a weed control device in areas requiring such an additional benefit. Still a third alternative exemplary construction is envisioned that would use jets of air to aid in entanglement of the hair.

All of the above-envisioned constructions of the first exemplary embodiment of the present invention may be generated with even very short strands of hair. Human and/or animal hair, which is generally available from a barbershop or veterinarian, respectively, is not readily woven and is not readily spun. The length of such hair makes it difficult to weave into a textile like sheet or layer, and it is difficult to form such hair into a spun fiber for subsequent processing. Instead, the above-described process may be used to provide a dense generally planar layer of intertwined individual strands of hair without the need for a backing or intermediate support. More specifically, the generally planar layer may have a density of generally about 0.02 to generally about 3 grams of hair per cubic inch of such layer.

The envisioned constructions of the first exemplary embodiment of the present invention include numerous advantages. First, while the planar layer may be dense, a large number of very small internal air pockets between the entangled hairs are a result of the construction process of the layer. These voids act in at least two ways to aid in promoting plant growth: they allow for optimal airflow within and about the plant whether used above or below the surface of the soil and when exposed to water the planar layer may store moisture within these voids in addition to that moisture already retained by the individual strands of hair. The result of such moisture retention is the reduced requirement for repeated watering of the plants with which the present invention is used. A second advantage is that the all-natural, one hundred percent biodegradable nature of the constructions allow for the possibility of simultaneous passive and active fertilization of the plant. The planar constructions may serve to absorb nutrients leaching through the soil that were either lost by the plant or its soil and the present invention may serve to retain such nutrients until such time as they are re-absorbed by the plant, its roots or the soil as needed. Further still, the present invention may passively fertilize the plant through the release of its chemical constituents (i.e., nitrogen) via biodegradation and microbial action.

In a second exemplary alternative embodiment, there may be provided a generally planar mat comprised of animal hair. As discussed above in detail, such planar mat may be constructed using any of the above-discussed techniques: needle punching, hydro-entanglement, or aero-entanglement. As before, the planar mat may serve to absorb and retain both moisture and nutrients for timed release.

A third exemplary embodiment of the present invention may be provided in which a generally planar mat comprised of a combination of human hair and animal hair. A fourth exemplary embodiment of the present invention may be provided in which such a generally planar mat is comprised of a single one of or combination of human hair, animal hair, and other natural fibers, including but not limited to, coconut fibers, seaweed, kelp, cotton, corn silk, and/or peat moss. As in the above-described alternative exemplary embodiments, the generally planar mats envisioned in the third and fourth exemplary embodiments may serve to both retain moisture for use by the root system of a plant and as both a passive and active source of nutrients for such plant. In a still further embodiment of the present invention, a plurality of man-made fibers may be mixed with the single one or combination of human hair, animal hair, and/or another natural fiber, as above defined.

Further, as with the earlier exemplary embodiments, the third and fourth embodiments may be constructed using any of the above-described fiber entangling techniques. As with the first and second exemplary embodiments, no backing or intermediate layer is required to prevent the deconstruction of the generally planar mat by tearing or fraying. It should also be noted that all of the above-envisioned exemplary embodiments may be of any desired size and three-dimensional shape. Such size and shape is limited only by the needs of the particular use for which the present invention is intended.

A fifth alternative exemplary embodiment is envisioned in which the present invention may be any general shape and which may be used in directly aiding the soil conditions for use in growing a plant from seed or during efforts to encourage root growth from a plant cutting. It should be realized that in either case the present invention may be comprised of a single one or combination of all of the above-discussed natural fibers and may be of any generally size or shape as required for the particular use. Additionally, as discussed above such exemplary embodiment may be manufactured using any of the above-disclosed construction techniques. Specifically, such embodiment may be viewed as tufts, pellets or generally cubic-shaped constructions of the present invention that may be mixed with the soil to provide additional aeration and nutrition to the plant roots.

Finally, a sixth alternative embodiment of the present invention is envisioned in which the planar layer of the first through fourth alternative exemplary embodiments may be formed into a generally hollow sleeve with or without a bisecting slit along the entire length of the tubular construction for use in wrapping plant cuttings, rubbings on plants or during plant grafting operations. Such generally hollow-shaped embodiment of the present invention may be composed of any of the above constructions, including being made of solely animal or human hair or being made of any combination of the above-mentioned natural fibers, including, but not limited to, human or animal hair. The length and thickness of such construction is similarly variable and may be left to a user designation.

The apparatus of the present invention in all of the above embodiments may be functional for use in numerous additional methodologies for the propagation of plant seeds, seedlings, cuttings, and re-plantings. For example, one such methodology that may include the use of any of the first through fourth exemplary embodiments includes the present invention as either a lining (i.e., beneath the soil) or as a weed shield (i.e., covering the upper soil surface) for the purposes of promoting the growth of the associated planting. As described above, the present invention may serve to retain moisture for use by the plants roots system over a longer period of time than a similar planting without such a lining or weed shield. Additionally, the present invention may serve to capture and re-release to the plant nutrients leached into the soil or absorbed from the water that would normally pass through the soil and be lost. When used as a weed shield, the present invention also serves the function of controlling weeds and deterring pests.

A second alternative exemplary methodology, known as air-layering, in which the sixth exemplary embodiment of the present invention may be used is the promotion of root development for the generation of seedlings and/or cuttings. The present invention by its nature is a highly flexible and formable device. Small versions of the present invention may be used to wrap around a limb or other portion of a plant or tree to encourage the formation of roots at a location convenient for cutting or removal of a portion of the plant, such as near the joining of a tree limb and its trunk. Such methodology allows for the continuous application of both fertilization and moisture to a defined location on a parent plant for the encouragement of the desired root formation. Such methodology is particularly of interest in the commercial plant industry where a faster turn-around of young and tender plants to vibrant and hardy plants capable of being re-planted, transported, or divided into more than one planting is desirable. Such methodology may also be used to promote initial root growth for hydroponically grown plants as well.

A third alternative exemplary methodology for the use of the present invention involves the use of an apparatus in accordance with the first through fourth exemplary embodiments described above in which the present invention may be attached to a section of a plant stem or tree limb that has had its protective outer layering removed to allow for exposure of the underlying living portion of the plant or tree. The continuous expose to moisture and a source of nutrients to the tree may encourage the formation of a growth (i.e., a second stem or limb) at the exposed location. Thus the present methodology may allow for user-directed shaping of growing plants through the use of the present invention.

A fourth exemplary methodology using the first through fourth exemplary embodiments, in any shape and size, is also envisioned for use in germinating seeds that may be planted directly therein. Such embodiment may be provided for use with plugs (plantings grown in trays) prior to their introduction to a container or their planting into the ground. As such these specialty embodiments are capable of acting as seed-specific germination promotion tools for use during the initial planting of seeds. As above, these embodiments of the present invention allow for optimal airflow about the seed/seedling while maintaining the ideal conditions for the seed to germinate: adequate air, water and sun at a consistent temperature. Such embodiments may also be used in coordination with germination of seeds in soil wherein seeds could be planted within the present invention under the soil.

A fifth methodology for using the present invention involves the use of the above described fifth embodiment of the present invention in which the present invention is used as an intermediate additive (i.e., tufts or pellets) within the soil itself. Such an exemplary embodiment may be comprised of any of the other disclosed or discussed embodiments cut or formed into any size or shape tufts or pellets. Such specialty embodiment may include between generally about 2.5% and generally about 50% tufts or pellets mixed with a growth medium, typically soil. Such additive may provide the same advantages as disclosed above: aeration of the soil, water retention nearer the roots, and both passive and active fertilization of the planting.

Finally, a sixth methodology for the use of the present invention is envisioned in which large sheet-like constructions of any of the first through fourth above-described embodiments of the present invention are used as under-laminates for landscaping projects. In particular, such constructions are envisioned as useful in areas with little to no top soil (i.e., areas lacking sufficient growth media to support new plantings or areas in which root anchorage is insufficient to maintain plantings). Such constructions may be of any shape or size desired but may be similar to the ten foot (10') by one hundred foot (100') sheets of black weed barrier cloth available in most home and garden stores.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters throughout the present specification and appended drawings is intended to represent the same or analogous features or elements of the invention.

DETAILED DESCRIPTION OF THE PREFERRED EMBODIMENTS

Reference will now be made in detail to presently preferred embodiments of the invention, examples of which are fully represented in the accompanying drawings. Such examples are provided by way of an explanation of the invention, not limitation thereof. In fact, it will be apparent to those skilled in the art that various modifications and variations can be made in the present invention, without departing from the spirit and scope thereof. For instance, features illustrated or described as part of one embodiment can be used on another embodiment to yield a still further embodiment. Still further, variations in selection of materials and/or characteristics may be practiced, to satisfy particular desired user criteria. Thus, it is intended that the present invention cover such modifications and variations as come within the scope of the present features and their equivalents.

Figure 1:
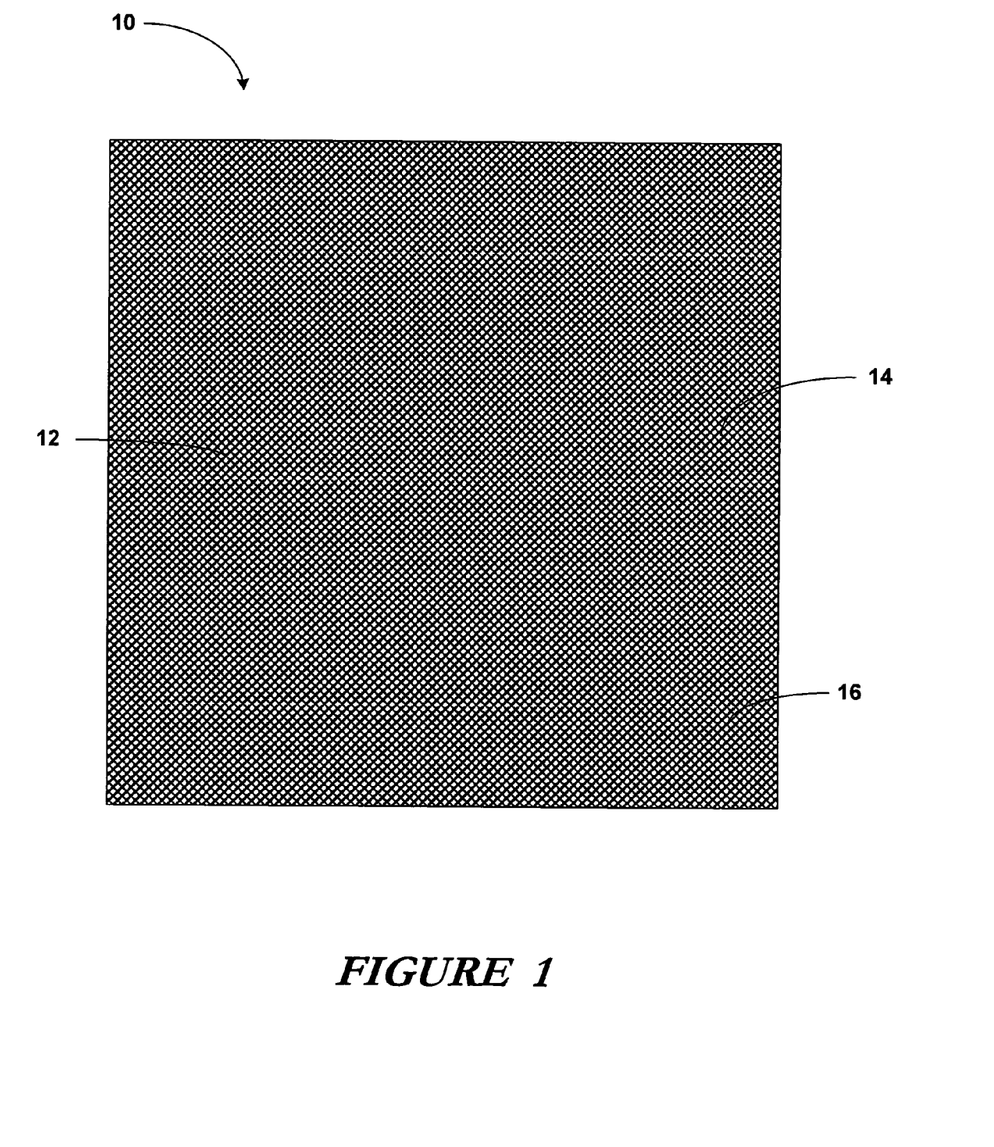
FIG. 1 is a plan view of a first exemplary embodiment of an apparatus in accordance with the present invention for use as a plant pot liner.

As disclosed above, the present invention is particularly concerned with a dual-use horticultural tool for aiding the proliferation of flora or trees. In a preferred embodiment of the present invention and as best seen in FIG. 1, a generally planar mat 10 may be provided. Human hair 12, animal hair 14 and/or a single type or combination of natural fibers 16, such as but not limited to coconut, seaweed, kelp, cotton, corn silk, and peat moss, may be intertwined together to form such mat 10. The construction 10 may be generated using techniques including needle punching, hydro-entanglement, or aero-entanglement.

Needle punch machines are known. Typically, however, such machines are used to force pluralities of fibers 12, 14, and 16 into a backing such as in the manufacture of carpet. Depending on the type of machine, barbed needles may be used to both force the fibers 12, 14, and 16 through a backing or intermediate layer and then grab such fiber 12, 14, and 16 and pull it back through the backing or intermediate layer to form loops of fibers 12, 14, and 16. In the present invention, a mass of natural fibers 12, 14, and 16, including but not limited to a single one of or a combination of human hair 12, animal hair 14, coconut fibers, seaweed, kelp, cotton, corn silk, and/or peat moss 16 is provided to a machine with a receptacle shaped generally as a planar layer or capable of compressing the mass during needle punching so as to form it into the generally planar shape desired. The needle is then passed repeated through the mass until each fiber 12, 14, and 16 is intertwined with the others to form the generally planar mat 10. Preferably, a mat 10 is generated with a density from generally about 0.02 to generally about 3 grams of fibers 12, 14, and 16 per cubic inch of mat 10. Additionally, the mat 10 is preferably capable of retaining from generally about 0.02 to generally about 15 grams of liquid per cubic inch of mat 10.

Similarly, the constructions of the present invention may be generated using either hydro-entangling or aero-entangling, the use one or more streams of water or other liquid or the use of one or more streams of air, respectively, in place of the barbed needle of the needle punch process described above. Regardless of the construction methodology used to generate the various embodiments of the present invention all maintain their above-described functionality. Those constructions made using the hydro-entanglement process, however, tend to be generally denser than those manufactured using either needle punching or aero-entanglement.

The intertwined hairs/fibers 12, 14 and 16 within the mat 10 serve to generate numerous small voids within the mat 10 similarly to that of a sponge that allows for both the passage of air or the retention of moisture for later use by the plant with which the mat 10 is associated. The mat 10 may serve as both an active and a passive nutrient source for the plant either by releasing captured nutrients leaching through the soil or by biodegrading into its baser chemical compounds. Multi-layer mats 10 may be formed by needle punching two or more completed mats 10 together without the use of an intermediate layer. Generally homogeneous mats comprised of more than one hair/fiber 12, 14, or 16 can be constructed by including all of such hair/fiber combination prior to the entanglement process.

Figure 2:
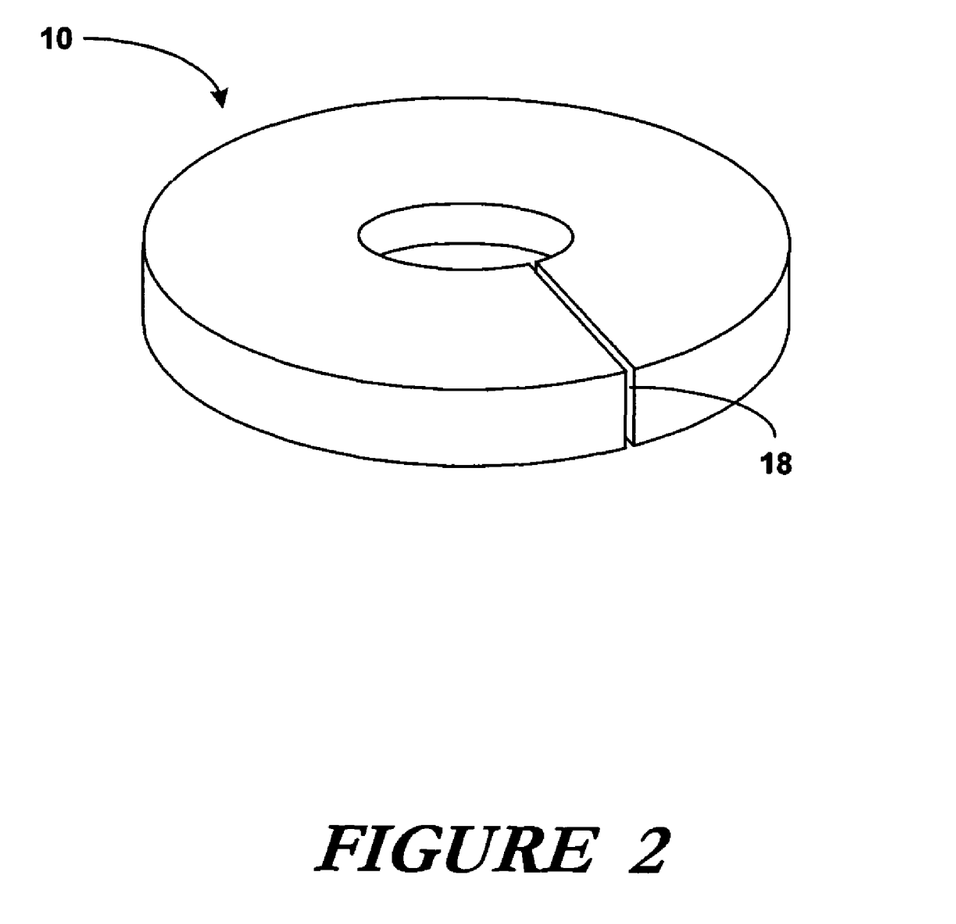
FIG. 2 is a plan view of a second exemplary embodiment of the apparatus of FIG. 1, for use as a weed shield on the soil surface around a planter.

FIGS. 1 and 2 show two exemplary embodiments of the present invention wherein the present invention is formed into a generally planar mat 10. The present invention is not limited to the depicted shapes. Instead, the present invention may be formed into any number of shapes, including, but not limited to rectangular planar mats, rectangular cubic solids, circular planar mats, circular planar disks, circular cylinders (in particular for use with seedlings and cuttings), and triangular, elliptical and other shapes as best suit a particular use of the present invention. Generally, however, regardless of the desired use, the mat 10 may be generally planer due to its inherent flexibility for wrapping around the trunks, limbs and stalks of various sized plants, as well as its ability to conform to the interior shapes of plant pots or to lie along the ground.

FIG. 1 depicts a generally planar mat 10 comprising at least one natural fiber from the group including, but not limited to, human 12 or animal 14 hair, coconut fiber, seaweed, kelp, cotton, corn silk and/or peat moss (collectively, 16). Such mat 10 is constructed from a plurality of individual fibers 16 using one of the above-described techniques of needle punching, hydro-entanglement, or aero-entanglement. Such generally planar mat 10 may be used as a liner for a plant pot to aid in both moisture retention and fertilization of the container-bound plant. FIG. 2 depicts an identical mat 10 similarly constructed and comprised of generally the same fibers 12, 14, and 16. This second exemplary embodiment, however, includes a slit 18 from the center of such mat 10 to its periphery for use in fitting the mat 10 about the stalk of the plant with which it is associated. Such exemplary embodiment may be used on the surface of the plant-growing medium as a weed control device for the area immediately about the plant, as well as, an aid in moisture retention and fertilization. Smaller versions of both of such embodiments may be used with plugs in growth trays.

Figure 3:
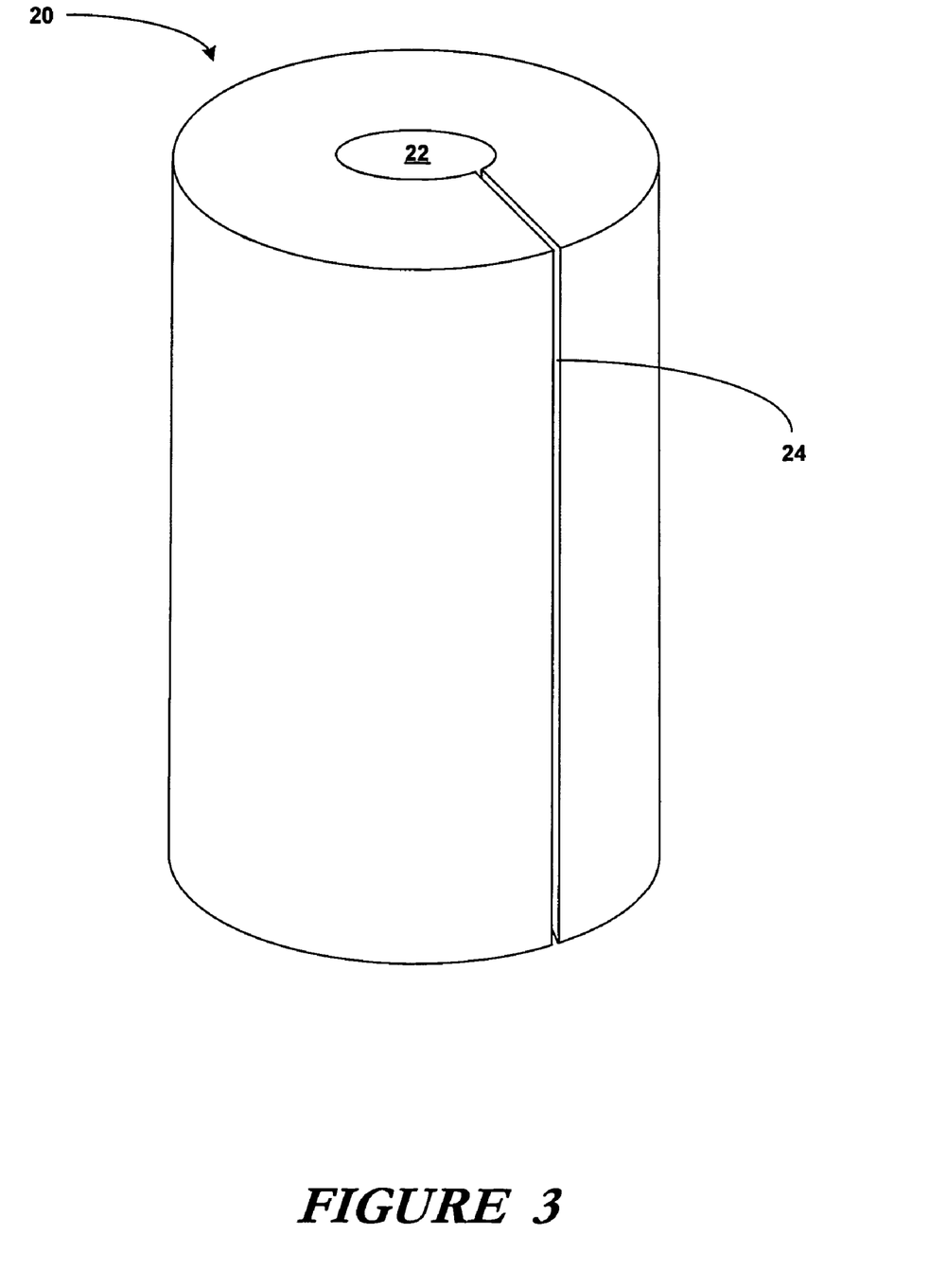
FIG. 3 is a perspective view of one exemplary embodiment of the present invention in use about the root end of a seedling or cutting of a plant.

FIG. 3 shows an embodiment of the present invention 20 that may be used in a method to aid in the stimulation of root growth. This method is known as air-layering. Gardeners and hobbyists spend a great deal of time developing their plants and growing them for division into multiple plants for inclusion into their gardens. Similarly, in the horticulture industry, commercial plant dealers have long sought a methodology capable of reducing the time required to transition such young plants into those capable of being divided, replanted and sold in the commercial market. The present embodiment is capable of use with such a methodology wherein a desired location on a tree limb or plant stem may be wrapped within a generally tubular shaped embodiment 20 of the present invention. When kept in a moistened state, the present invention provides the plant all of the requirements it needs to promote accelerated root growth: a consistent source of moisture, adequate airflow, and a nutrient source that may remain with the plant even after a significant root system has developed to continue providing a nutrient base throughout the biodegradation of the present invention. When sufficient root development has occurred to enable a division of the plant, the plant may be cut just below the root growth to form two or more plants.

As described above, the embodiment of FIG. 3 is comprised of at least one natural fiber from the group including, but not limited to, human 12 or animal 14 hair, coconut fiber, seaweed, kelp, cotton, corn silk and/or peat moss (collectively, 16) using one of the needle punching, hydro-entangling or aero-entangling construction techniques. Such present embodiment is a generally tubular shaped construction 20 with a central passage 22 for acceptance of the seedling or cutting. Such construction 20 further includes a slit 24 along the entire length of the construction 20.

Figure 4:
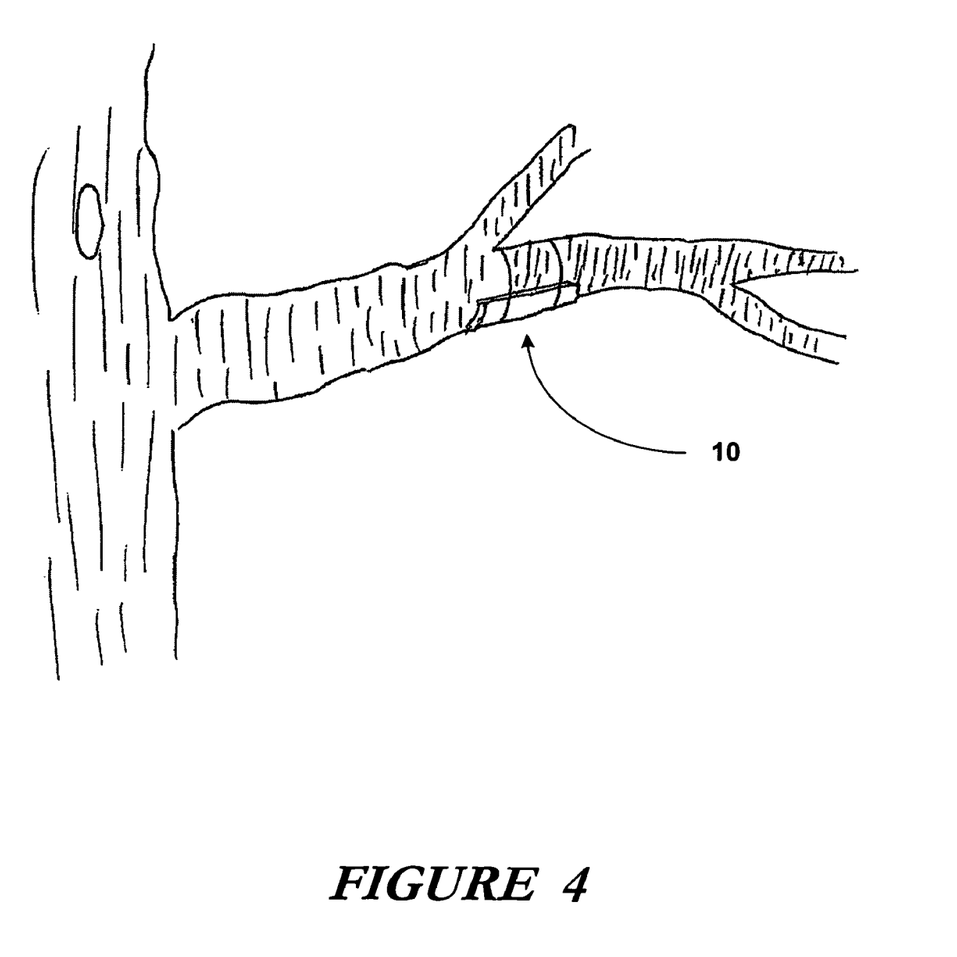
FIG. 4 is a perspective view of one exemplary embodiment of the present invention in use about a rubbing of a tree limb to encourage growth of a new limb.

FIG. 4 depicts the use of another embodiment 30 of the present invention in an alternative methodology for the enhanced growth of an already developed plant 32. Nurseries often suffet a failure to sell certain trees and larger plantings due to a lack of aesthetics. For instance, a tree may not be very balanced in the distribution of its limbs for any of a number of reasons. In the past, to promote growth on a "bare" side of a tree trunk, tree nurseries have been forced to make significant efforts to encourage growth to fill out the tree. If such efforts failed, the tree was often not capable of sale except at a loss.

The present embodiment 30 of the present invention allows horticulturists to place on or about the limb 32 or trunk 34 of a tree or the stalk of a larger plant the present invention 30 where a scrapping of the outer protective covering of the plant (the bark in the case of a tree) has been made and which exposes the interior pulp or growth portion of the tree. The consistent exposure of this opening to moisture, air, light and a source of nutrients encourage the formation of a growth to close the opening. Generally, this growth comes in the formation of a new tree limb or second main branch of the plants' stem.

Figure 5:
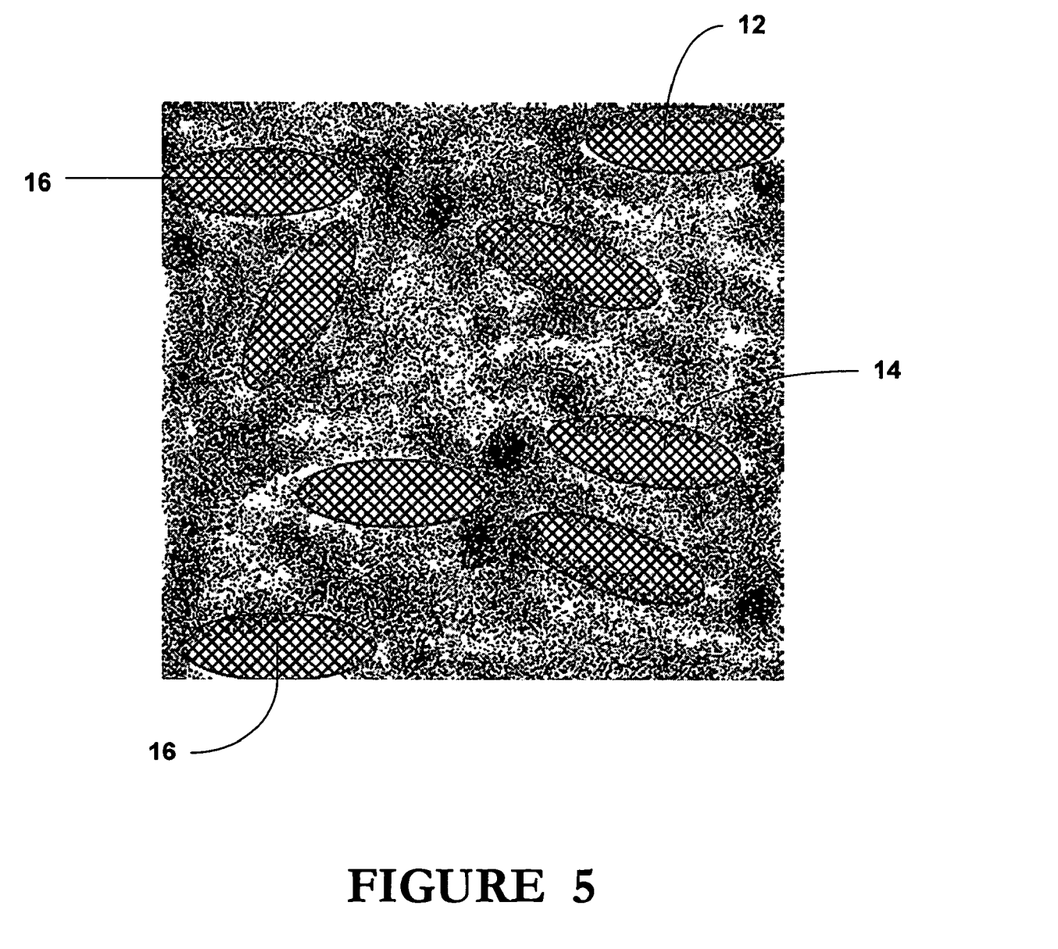
FIG. 5 is a perspective view of a fifth exemplary embodiment of the present invention for use as a growth medium additive.

FIG. 5 shows yet another alternative embodiment of the present invention in which the generally planar mat of material comprising at least one or any combination of the natural fibers from the group including, but not limited to, human 12 or animal 14 hair, coconut fiber, seaweed, kelp, cotton, corn silk and/or peat moss (collectively, 16) and manufactured using one of the needle-punching, hydro-entangling or aero-entangling construction techniques is cut and/or shaped to form tufts or pellets of the material for inclusion into a growth medium. As above described, such present embodiment is mixed with a growth medium as generally about a 1% to generally about a 50% mixture. Such growth medium is generally top soil or potting soil. The present exemplary embodiment provides the same advantages as disclosed above, including: aeration of the soil to provide adequate oxygen to the roots of any plantings; water retention within the material itself to aid in maintaining water nearer the root system while reducing water drainage in potted plants; and both passive (i.e., the release of nutrients to the plant through the biodegradation of the construction itself) and active fertilization (i.e., the capture and re-release of nutrients leached into the soil or absorbed from the water that normally pass through the soil and are lost). Additionally, the use of the present embodiment can aid in enhancing the root anchorage of plantings within such soil. The result is a generally healthier and stronger plant.

Figure 6:
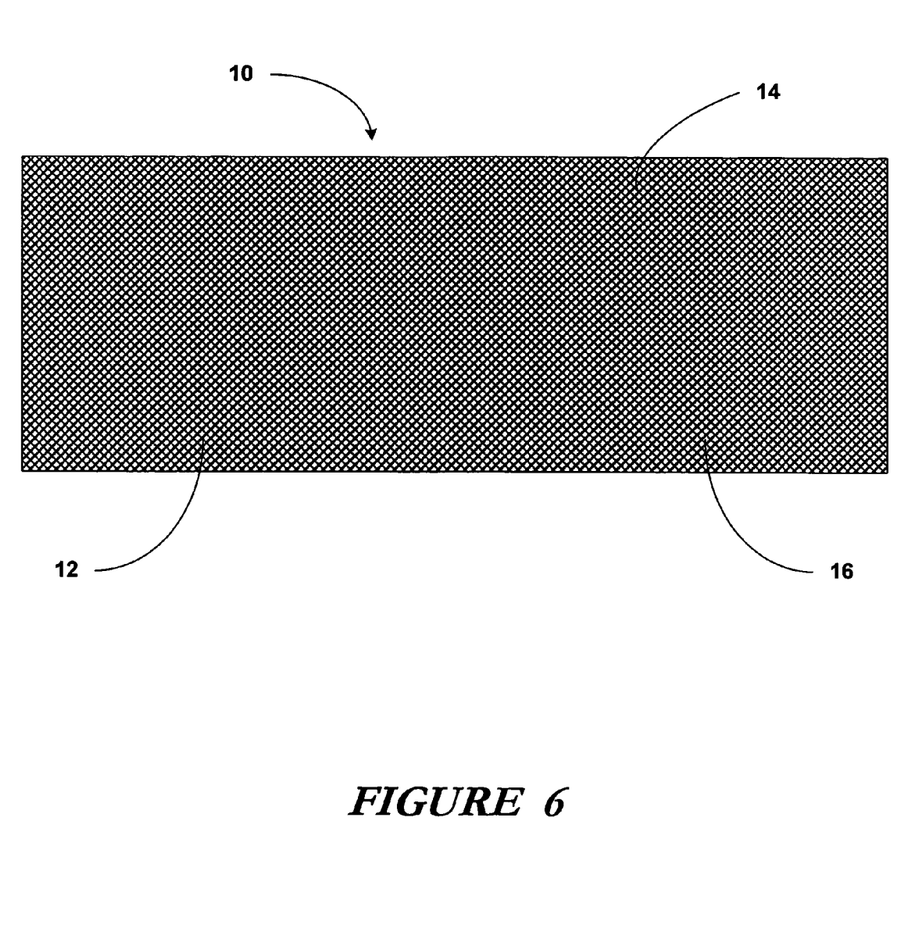
FIG. 6 is a perspective view of a sixth exemplary embodiment of the present invention for use as a landscaping under-laminate.

Finally, FIG. 6 depicts another alternative embodiment of the multi-function horticultural invention in which the present invention may be constructed as above described and using construction techniques and materials as listed above, wherein the present invention is formed into generally planar sheets of material ranging in size from generally about twelve (12) inches to generally about seventy-two (72) inches in width and of any length desired. Such "sheets" of material are envisioned for use as a landscaping under-laminate for areas in which the top layer of soil is either thin or lacking altogether.

In the instance in which such a sheet of material is used with a thin upper layer of soil, the present embodiment serves both as an additive to the soil—aiding in moisture retention and fertilization, but also as an anchorage for the new plantings. In the event of relatively no soil layer (as near volcanic rock or other more challenging growing locations), the present invention serves as a basis for establishing plants so as to enable the retention of soil introduced to the planting site and to similarly aid in preventing future erosion of such soil after its introduction.

Although several preferred embodiments of the invention have been described using specific terms and devices, such descriptions are for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged both in whole or in part. Therefore, the spirit and scope of the appended claims should not be limited to the description of the preferred versions contained herein.

What is claimed is:

1. A multi-function horticultural device comprising:
a plurality of individual natural fibers intertwined such that said device has a density from generally about 0.02 to generally about 3 grams of said individual natural fibers per cubic inch, wherein said device is capable of holding and retaining from generally about 0.02 to generally about 15 grams of liquid per cubic inch and wherein said device is generally homogeneous.

2. A multi-functional horticultural device as in claim 1, wherein said device includes at least one natural fiber from the group including human hair, animal hair, coconut fiber, seaweed, kelp, cotton, corn silk and peat moss.

3. A multi-cultural horticultural device as in claim 2, wherein said plurality of individual natural fibers are intertwined by needle punching.

4. A multi-functional horticultural device as in claim 3, wherein said device is formed into a shape from the group including a generally rectangular planar mat, a generally rectangular solid, a disk, and a generally circular cylinder, depending on its intended usage.

5. A multi-functional horticultural device as in claim 4, wherein said device further comprises a plurality of man-made fibers.

6. A multi-functional horticultural device as in claim 2, wherein said plurality of individual natural fibers may be formed into any pre-defined three-dimensional shape.

7. A multi-functional horticultural device as in claim 2, wherein said plurality of individual natural fibers are intertwined by hydro-entangling.

8. A multi-functional horticultural device as in claim 7, wherein said plurality of individual natural fibers may be formed into any pre-defined three-dimensional shape.

9. A multi-functional horticultural device as in claim 8, wherein said device is formed into a shape from the group including a generally rectangular planar mat, a generally rectangular solid, a disk, and a generally circular cylinder, depending on its intended usage.

10. An accumulation of natural fibers as in claim 2, wherein said accumulation of natural fibers are intertwined using aero-entanglement.

11. A multi-functional horticultural device as in claim 10, wherein said plurality of individual natural fibers may be formed into any pre-defined three-dimensional shape.

12. A multi-functional horticultural device as in claim 11, wherein said device is formed into a shape from the group including a generally rectangular planar mat, a generally rectangular solid, a disk, and a generally circular cylinder, depending on its intended usage.

13. A multi-functional horticultural device as in claim 1, wherein said device is capable of both passively and actively fertilizing a plant with which it is associated and wherein such passive fertilization is the result of said device's biodegradation and microbial action.

14. A multi-function horticultural device as in claim 1, wherein said device serves to reduce the growth and propagation of weeds in ground covered with said device.

15. A multi-function horticultural device as in claim 1, wherein said device serves to inhibit the activity of pests from the general area of a plant with which said device is associated.

16. A multi-function horticultural device as in claim 1, wherein said device serves to reduce the watering needs of a planting with which it is associated through its moisture retention capability.

17. A method for stimulating root development at defined location on an existing plant using an air-layering technique, comprising the steps of:
 a) providing a multi-functional horticultural device comprising a plurality of intertwined individual natural fibers, wherein said device has a density from generally about 0.02 to generally about 3 grams of fibers per cubic inch;
 b) exposing a portion of a plant stem or branch by removing its outermost protective surface;
 c) wrapping said exposed portion of said stem or branch with said device; and
 d) maintaining said device in a generally moistened condition.

18. The method of claim 17, wherein said plurality of individual natural fibers are intertwined by needle punching.

19. The method of claim 17, wherein said plurality of individual natural fibers are intertwined using hydro-entanglement.

20. The method of claim 17, wherein said plurality of individual natural fibers are intertwined using aero-entanglement.

21. The method of claim 17, wherein said device includes at least one natural fiber from the group including human hair, animal hair, coconut fiber, seaweed, kelp, cotton, corn silk, and peat moss.

22. The method of claim 21, wherein said device is capable of both passively and actively fertilizing a plant with which it is associated and wherein such passive fertilization is the result of said device's biodegradation and microbial action.

23. A method for stimulating seed germination using a multi-functional horticultural device, comprising the steps of:
 a) providing a multi-functional horticultural device comprising a plurality of intertwined individual natural fibers, wherein said device has a density from generally about 0.02 to generally about 3 grams of fibers per cubic inch;
 b) planting a seed in a plug tray recess, wherein said device is used as a liner for said plug tray recess so as to aid in moisture retention and fertilization of the soil in such plug tray recess; and
 c) maintaining said seed-retaining plug tray recess in a generally moistened condition.

24. The method of claim 23, wherein said plurality of individual natural fibers are intertwined by needle punching.

25. The method of claim 23, wherein said plurality of individual natural fibers are intertwined using hydro-entanglement.

26. The method of claim 23, wherein said plurality of individual natural fibers are intertwined using aero-entanglement.

27. The method of claim 23, wherein said device includes at least one natural fiber from the group including human hair, animal hair, coconut fiber, seaweed, kelp, cotton, corn silk, and peat moss.

28. The method of claim 23, wherein said device is capable of both passively and actively fertilizing a plant with which it is associated and wherein such passive fertilization is the result of said device's biodegradation and microbial action.

29. A method of enhancing root development in plantings using a multi-functional horticultural device, comprising the steps of:
 a) providing a multi-cultural horticultural device comprising a plurality of intertwined individual natural fibers, wherein said device has a density from generally about 0.02 to generally about 3 grams of fibers per cubic inch and wherein said device is capable of holding and retaining from generally about 0.02 to generally about 15 grams of liquid per cubic inch and wherein said device has been shaped into a plurality of tufts or pellets;
 b) mixing said plurality of tufts or pellets with a growth medium;
 c) planting at least one plant in said mixed growth medium; and
 d) maintaining said growth medium in a generally moistened condition.

30. The method of claim 29, wherein said plurality of individual natural fibers are intertwined by needle punching, without backing material.

31. The method of claim 29, wherein said plurality of individual natural fibers are intertwined using hydro-entanglement.

32. The method of claim 29, wherein said plurality of individual natural fibers are intertwined using aero-entanglement.

33. The method of claim 29, wherein said device includes at least one natural fiber from the group including human hair, animal hair, coconut fiber, seaweed, kelp, cotton, corn silk, and peat moss.

34. The method of claim 29, wherein said device is capable of both passively and actively fertilizing a plant with which it is associated and wherein such passive fertilization is the result of said device's biodegradation and microbial action.

35. A method for establishing ground cover in locations having minimal natural soil, comprising the steps of:
 a) providing a multi-cultural horticultural device comprising a plurality of intertwined individual natural fibers, wherein said device has a density from generally about 0.02 to generally about 3 grams of fibers per cubic inch and wherein said device has been shaped into generally planar sheets;

b) planting said ground cover on top of said device, wherein the weight of said ground cover is sufficient to secure said generally planar sheets of said device in place; and c) maintaining said ground cover in a generally moistened condition.

36. The method of claim 35, wherein said plurality of individual natural fibers are intertwined by needle punching.

37. The method of claim 35, wherein said plurality of individual natural fibers are intertwined using hydro-entanglement.

38. The method of claim 35, wherein said plurality of individual natural fibers are intertwined using aero-entanglement.

39. The method of claim 35, wherein said device includes at least one natural fiber from the group including human hair, animal hair, coconut fiber, seaweed, kelp, cotton, corn silk, and peat moss.

40. The method of claim 35, wherein said device is capable of both passively and actively fertilizing a plant with which it is associated and wherein such passive fertilization is the result of said device's biodegradation and microbial action.

* * * * *